United States Patent
Berkemeier et al.

(10) Patent No.: US 10,954,831 B2
(45) Date of Patent: Mar. 23, 2021

(54) DEVICE FOR SUPPLYING LUBRICANT

(71) Applicant: Ford Global Technologies, LLC, Dearborn, MI (US)

(72) Inventors: Oliver Berkemeier, Bergisch Gladbach (DE); Bernd Steiner, Bergisch Gladbach (DE)

(73) Assignee: Ford Global Technologies, LLC, Dearborn, MI (US)

(*) Notice: Subject to any disclaimer, the term of this patent is extended or adjusted under 35 U.S.C. 154(b) by 162 days.

(21) Appl. No.: 16/224,672

(22) Filed: Dec. 18, 2018

(65) Prior Publication Data
US 2019/0211720 A1    Jul. 11, 2019

(30) Foreign Application Priority Data
Jan. 11, 2018  (DE) .......................... 102018200405.6

(51) Int. Cl.
| | |
|---|---|
| F01M 1/16 | (2006.01) |
| F02D 19/02 | (2006.01) |
| F02M 21/02 | (2006.01) |
| F01M 1/02 | (2006.01) |
| F01M 3/02 | (2006.01) |
| F02D 19/12 | (2006.01) |
| F02M 25/00 | (2006.01) |
| F02M 63/00 | (2006.01) |

(52) U.S. Cl.
CPC ............... *F01M 1/16* (2013.01); *F01M 1/02* (2013.01); *F01M 3/02* (2013.01); *F02D 19/02* (2013.01); *F02D 19/12* (2013.01); *F02M 21/0215* (2013.01); *F02M 21/0248* (2013.01); *F02M 25/00* (2013.01); *F02M 63/0001* (2013.01)

(58) Field of Classification Search
CPC .......... F02D 19/02; F02D 19/12; F01M 1/16; F01M 1/02; F01M 3/02
See application file for complete search history.

(56) References Cited

U.S. PATENT DOCUMENTS

| | | | |
|---|---|---|---|
| 2,258,323 A | 10/1941 | Gray | |
| 5,682,851 A * | 11/1997 | Breen | F01M 9/108 123/196 A |

(Continued)

FOREIGN PATENT DOCUMENTS

| | | |
|---|---|---|
| CN | 202300566 U | 7/2012 |
| CN | 104675592 A | 6/2015 |

(Continued)

*Primary Examiner* — Kevin A Lathers
(74) *Attorney, Agent, or Firm* — Geoffrey Brumbaugh; McCoy Russell LLP

(57) ABSTRACT

A device for supplying lubricant for a fuel injection nozzle for injecting compressed natural gas (CNG) into an internal combustion engine is provided. The device includes a lubricant reservoir for supplying lubricant and having a feed pressure supply apparatus for applying a feed pressure to lubricant which is stored in the lubricant reservoir, where a feed pressure valve for setting the feed pressure is provided between the feed pressure supply apparatus and the lubricant reservoir, and a lubricant metering valve for metering the lubricant supply is provided between the lubricant reservoir and the fuel injection nozzle, where the lubricant is fed to the lubricant reservoir from an oil gallery of the internal combustion engine.

19 Claims, 2 Drawing Sheets

(56) References Cited

U.S. PATENT DOCUMENTS

| | | | | |
|---|---|---|---|---|
| 2003/0019478 | A1* | 1/2003 | Gibson | F04B 7/0076 |
| | | | | 123/456 |
| 2004/0109768 | A1* | 6/2004 | Sommars | F02M 59/46 |
| | | | | 417/307 |
| 2007/0040053 | A1 | 2/2007 | Date | |
| 2013/0179049 | A1 | 7/2013 | Grieser et al. | |
| 2014/0246508 | A1 | 9/2014 | Caley et al. | |
| 2016/0290187 | A1 | 10/2016 | Coates | |

FOREIGN PATENT DOCUMENTS

| | | |
|---|---|---|
| CN | 204638414 U | 9/2015 |
| CN | 105525989 A | 4/2016 |
| DE | 69628979 T2 | 2/2004 |
| DE | 102006008902 A1 | 9/2007 |
| JP | 03290055 A * | 12/1991 |

\* cited by examiner

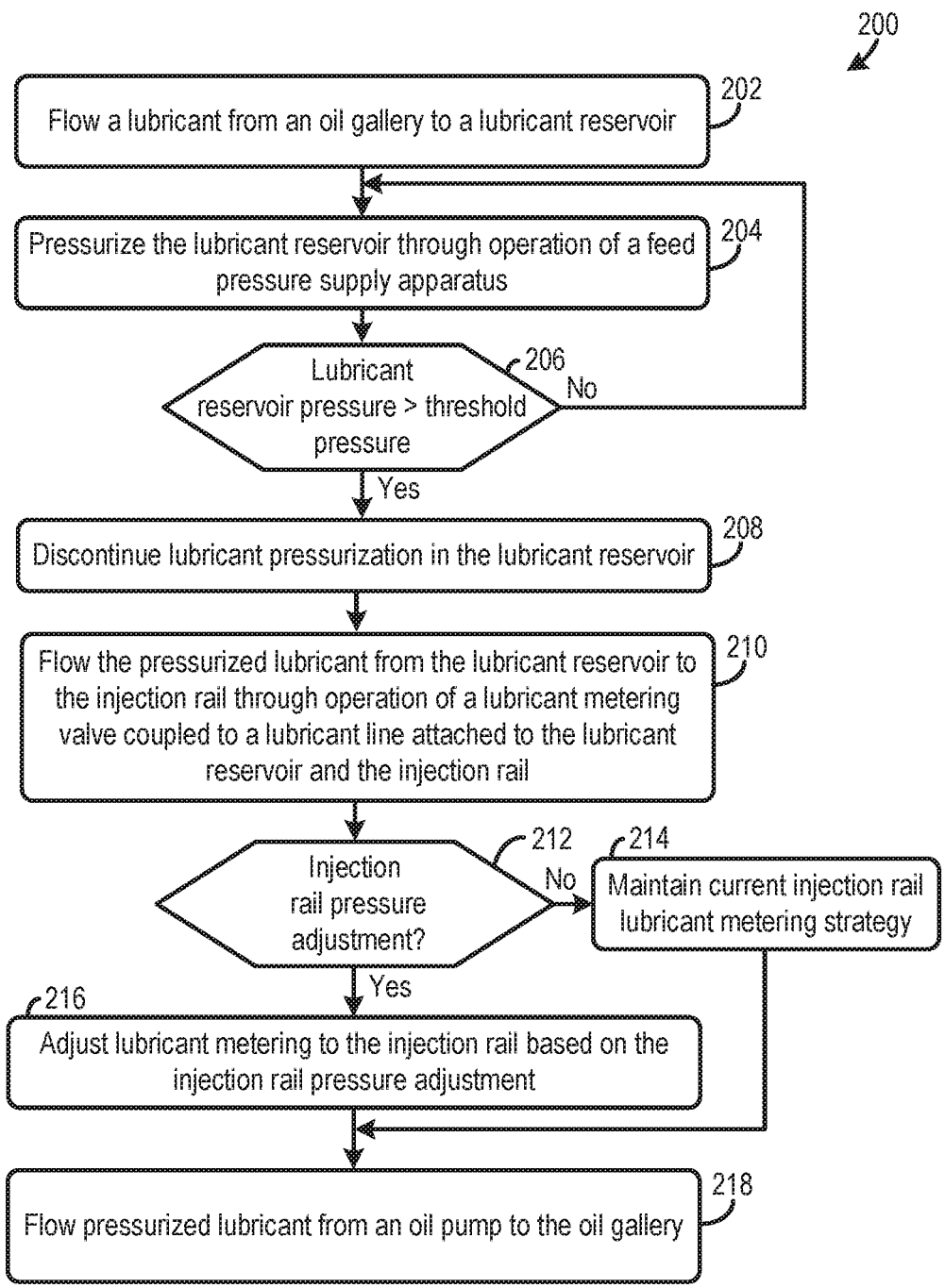

DEVICE FOR SUPPLYING LUBRICANT

CROSS REFERENCE TO RELATED APPLICATION

The present application claims priority to German patent application No. 102018200405.6, filed on Jan. 11, 2018. The entire contents of the above-listed application are hereby incorporated by reference for all purposes.

FIELD

The present disclosure relates a device for supplying lubricant for a fuel injection nozzle for injecting compressed natural gas (CNG) into an internal combustion engine.

BACKGROUND/SUMMARY

For the last few years natural gas has been increasingly used as a fuel for corresponding motorized motor vehicles. The storage, transportation and refueling are either carried out as compressed natural gas (CNG), i.e., as heavily compressed but still gaseous natural gas or as liquefied natural gas (LNG), i.e., natural gas which has been liquefied by severe cooling and is kept in liquid form through storage in pressurized vessels.

The advantage of natural gas is a cleaner combustion process when compared to gasoline and diesel. In the case of CNG this is because, on the one hand, CNG is already present in a homogenous gaseous form in the combustion chamber and not in an atomized form like gasoline and diesel, and, on the other hand, the molecule chains contain only approximately half as many carbon atoms with respect to the hydrogen atoms as those in gasoline and diesel, thus when combustion occurs with oxygen more water ($H_2O$) and less carbon dioxide ($CO_2$) and soot are produced.

Since at normal atmospheric pressure natural gas has a very low energy density in comparison to diesel fuel for example—with 0.036 MJ/L a lower volumetric calorific value than that of diesel which is 34.7 MJ/L, the natural gas is compressed to approximately 200 bar, in order to be able to carry along a sufficient quantity of energy in an acceptable volume in the motor vehicle.

The combustion process differs in that, instead of a gasoline/air mixture, a natural gas/air mixture is compressed, ignited and burnt in the cylinders.

Internal combustion engines which are operated with CNG as the fuel have special injection nozzles. For safe and continuous operation, a minimum degree of lubrication is necessary, but the fuel CNG does not provide this. Therefore, the service life and operational reliability of CNG injection nozzles are limited, since the lack of lubrication causes damage.

Therefore, an objective of the invention is to indicate ways in which the lubrication of specifically an injection nozzle of an internal combustion engine which is operated with CNG as a fuel can be improved.

The inventors have recognized the abovementioned problems. The problems may be at least partially addressed by a device for supplying lubricant for a fuel injection nozzle for injecting CNG into an internal combustion engine, having a lubricant reservoir for supplying lubricant and having a feed pressure supply apparatus for applying a feed pressure to lubricant which is stored in the lubricant reservoir, wherein a feed pressure valve for setting the feed pressure is provided between the feed pressure supply apparatus and the lubricant reservoir, and a lubricant metering valve for metering the lubricant supply is provided between the lubricant reservoir and the fuel injection nozzle. Additionally, the device draws lubricant into the lubricant reservoir from the oil gallery. With this device for supplying lubricant, it is possible to improve the supply of lubricant to injection nozzles of a reciprocating piston internal combustion engine which is operated with CNG as fuel. Furthermore, by drawing lubricant into the reservoir from the oil gallery the lubricant can be reliably gathered from the lubrication system and then subsequently pressurized in the reservoir for precise lubricant dosing into the fuel injection nozzle. The likelihood of under-lubrication or over-lubrication of the fuel injection nozzle is therefore diminished.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

FIG. 2 shows a method for operation of a fuel delivery system.

DETAILED DESCRIPTION

Figure 1:
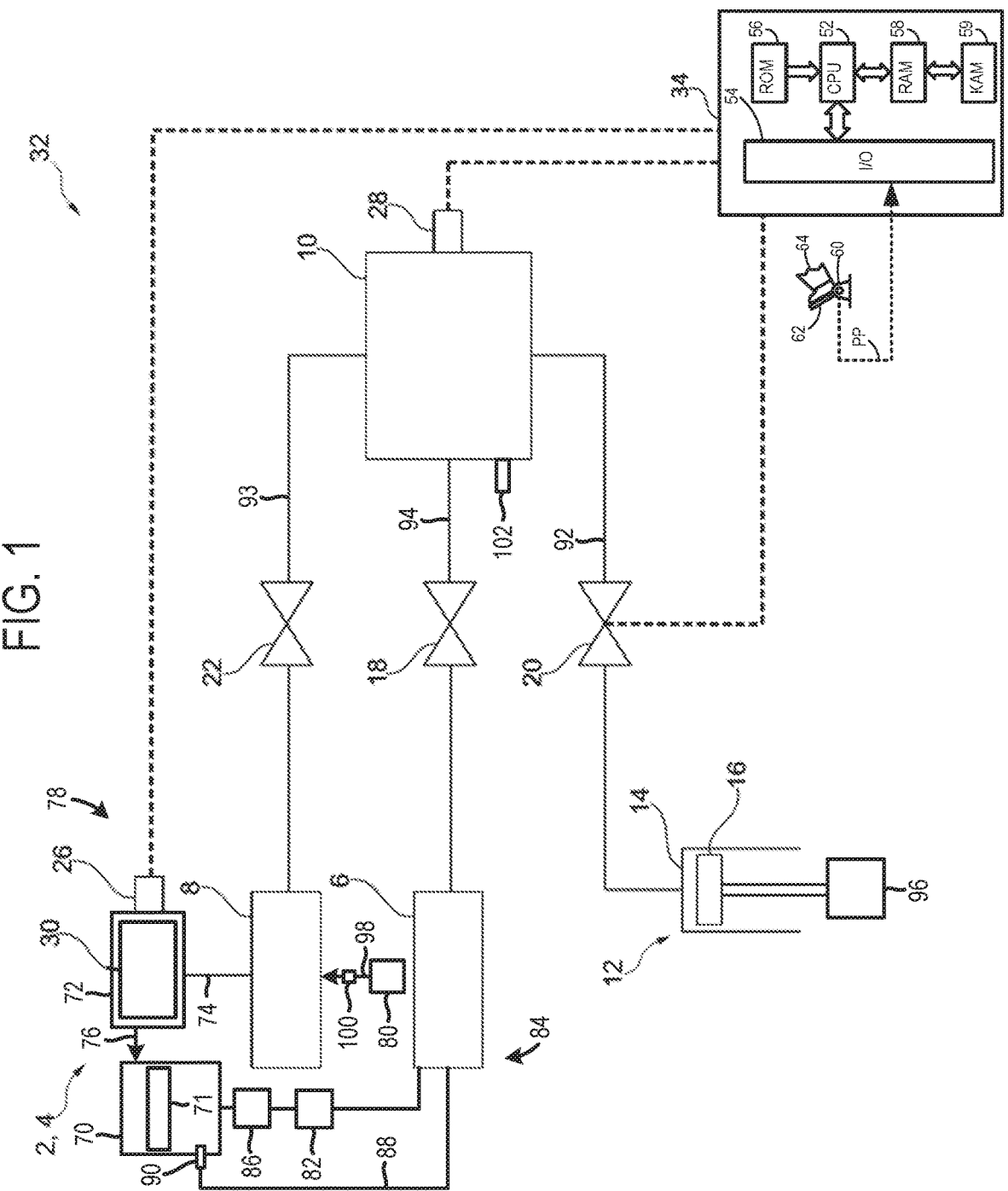
FIG. 1 shows an engine including a fuel delivery system having a device for injection rail lubricant dosing.

A device is for supplying a lubricant for a fuel injection nozzle for injecting compressed natural gas (CNG) into an internal combustion engine is described herein. The device includes a lubricant reservoir for supplying the lubricant to the device and a feed pressure supply apparatus for applying a feed pressure to the lubricant which is stored in the lubricant reservoir. The device further includes a feed pressure valve for setting the feed pressure and provided between the feed pressure supply apparatus and the lubricant reservoir. The device further includes a lubricant metering valve for metering the lubricant is provided between the lubricant reservoir and the fuel injection nozzle. Additionally, in the device lubricant is fed to the lubricant reservoir from an oil gallery of the internal combustion engine.

In one example, the feed pressure supply apparatus and the lubricant reservoir connect a first lubricant-conducting line, to which the feed pressure valve is assigned. Therefore, in such an example, the feed pressure which is supplied by the feed pressure supply apparatus can be reduced with the feed pressure valve. The lubricant reservoir and the fuel injection nozzle connect a second lubricant-conducting line, to which the lubricant metering valve is assigned. Therefore, with the lubricant metering valve the quantity of lubricant which is fed to the fuel injection nozzle can be reduced. A precisely dosed quantity of lubricant, such as e.g., lubricating oil, can thus be fed during operation, which counteracts damage as a result of inadequate lubrication and therefore increases the service life of the injection nozzle. In other words, liquid lubricant is fed to an internal combustion engine which is operated with a gaseous fuel.

According to one embodiment, lubricant can be fed into the lubricant reservoir from the internal combustion engine. In other words, lubricant is used which is also used to lubricate other components of the internal combustion engine, such as e.g., pistons in cylinders. In addition it is also possible to provide a lubricant reservoir designed to store a quantity of lubricant which is related to the service life. In this case, a specially adapted lubricant can be used. In other words, two different lubricants are used, a first lubricant for lubricating the fuel injection nozzle and a second lubricant for lubricating the other components of the internal combustion engine.

According to a further embodiment, a shut-off valve is provided between the internal combustion engine and the lubricant reservoir. In this context, a third lubricant-conducting line connects the oil gallery and the lubricant reservoir, to which the shut-off valve is assigned. Therefore, by opening and closing the shut-off valve, the lubricant reservoir can be filled specifically as necessary and thus a sufficient lubricant supply can be achieved.

According to a further embodiment, lubricant can be fed from an oil gallery of the internal combustion engine into the fuel reservoir. An oil gallery serves to supply the pistons in their respective cylinders of an internal combustion engine with lubricant. It is thus also ensured that lubricant is tapped at a location with a high reliability of lubricant supply.

According to a further embodiment, lubricant can be fed from an oil sump of the internal combustion engine into the lubricant reservoir. In an oil sump, the lubricant of a lubricant circuit of the internal combustion engine collects before it is recirculated. It is thus also ensured that lubricant is tapped at a location with a high reliability of lubricant supply.

According to a further embodiment, a first measured pressure value which is representative of a pressure in the fuel injection nozzle and a second measured pressure value which is representative of a pressure in the lubricant reservoir can be acquired with a pressure-detection apparatus, and the device is designed to close the feed pressure valve if the second measured pressure value is higher than the first measured pressure value. When necessary, it is therefore possible to prevent a pressure-induced reversal of flow of the lubricant, which would otherwise lead to an under-supply of lubricant.

According to a further embodiment, the feed pressure supply apparatus has a cylinder and a piston which can be moved in the cylinder. In this context, the piston can be designed to move via a motor in the cylinder, i.e., a drive, e.g., a solenoid or an electric motor, which are operatively connected to the piston.

According to a further embodiment, the fuel injection nozzle is connected to an injection rail. In the case of a central point injection (CPI), CNG is thus injected into an intake manifold of the internal combustion engine, while in the case of a multi-point injection (MPI), CNG is injected in a decentralized fashion at the respective individual ends of the intake manifold, upstream of the cylinder inlet valve. In both cases, intake manifold injection occurs. Alternatively, the fuel injection nozzle can also be designed to inject CNG directly into the respective cylinder of the internal combustion engine.

In addition, the invention includes an internal combustion engine having such a device, and a motor vehicle having such an internal combustion engine.

An internal combustion engine 2, which is embodied as a traction engine of a motor vehicle 50, such as e.g., a passenger car, is illustrated in FIG. 1.

The internal combustion engine 2 in the present exemplary embodiment is a reciprocating piston internal combustion engine which is embodied as a spark-ignition engine. In contrast to the present exemplary embodiment, the internal combustion engine 2 can also be embodied as a diesel engine. In addition, the internal combustion engine 2 can be turbo-charged and/or supercharged. Furthermore, in the present exemplary embodiment, the internal combustion engine 2 is designed for intake manifold injection, i.e., as a self-induced engine. In contrast to the present exemplary embodiment, the internal combustion engine 2 can be designed for direct injection. The engine 2 include a cylinder 70 and a piston 71 disposed therein. The engine 2 is configured to carry out combustion cycles (e.g., four stroke combustion cycles) in the cylinder 70. Furthermore, the piston 71 may be mechanically coupled to a transmission (not shown) providing motive power to one or more drive wheels (not shown).

The internal combustion engine 2 is designed to be operated with CNG as fuel. CNG is understood here to be natural gas which is compressed (e.g., to approximately 200 bar), thus a compressed, i.e., highly compressed, but still gaseous natural gas. Therefore, in the present exemplary embodiment of the internal combustion engine 2, a gas mixture composed of air and natural gas is fed to the cylinder 70 in the engine. However, with spark-ignition engines operated with gasoline an air/fuel aerosol is fed to a cylinder.

Furthermore, the internal combustion engine 2 in the present exemplary embodiment has a fuel injection nozzle 30. The nozzle 30 may be downstream of a throttle valve (not illustrated) of the internal combustion engine 2, in the case of a port injection configuration. The fuel injection nozzle 30 is included in a fuel injector 72. In one example, the fuel injection nozzle 30 ends in an intake manifold (not illustrated) of the internal combustion engine 2 and is connected to an injection rail 8 via a connecting line 74. Therefore, the internal combustion engine 2 in the present exemplary embodiment is designed for central point injection (CPI) into the intake manifold of the internal combustion engine 2. However, in other examples, direct fuel injection may be additionally or alternatively employed in the internal combustion engine 2. Furthermore, in contrast to the present exemplary embodiment, the internal combustion engine 2 can also be designed for multi-point injection (MPI), in which the CNG is injected in a decentralized fashion at the respective individual ends of the intake manifold, upstream of a cylinder inlet valve.

Alternatively, the fuel injection nozzle 30 may be designed to inject CNG directly into the respective cylinder of the internal combustion engine 2 or both port and direct injection may be used, in some cases. Arrow 76, therefore, indicates the delivery of fuel from the fuel injection nozzle 30 to the cylinder 70, using either port and/or direct injection devices.

In the illustrated example, the internal combustion engine 2 includes a CNG fuel delivery system 78. However, other fuel delivery systems (e.g., gaseous fuel delivery systems) in the engine have been envisioned. The CNG fuel delivery system 78 may include the fuel injector 72 and the injection rail 8, in one example. The injection rail 8 may be coupled to and receive CNG from a CNG reservoir 80 storing pressurized CNG. The CNG fuel delivery system 78 may also include valves, pumps for pressurizing the CNG in the CNG reservoir, etc.

For reliable and continuous operation of the fuel injection nozzle 30 it may be necessary to ensure a desired amount (e.g., minimum) of lubrication. However, this desired amount (e.g., minimum) of lubrication cannot be supplied solely by the fuel CNG.

In order to supply a desired amount (e.g., minimum) of lubrication and therefore increase the service life and operational reliability of the internal combustion engine 2, a device 4 for supplying lubricant for the fuel injection nozzle 30 is provided.

The device 4 for supplying lubricant has, in the present exemplary embodiment, a lubricant reservoir 10 for supplying lubricant, lubricant oil in the present exemplary embodiment, and a feed pressure supply apparatus 12 for applying a feed pressure to lubricant which is stored in the lubricant reservoir 10. It will be appreciated that in one example, the feed pressure supply apparatus 12 and an oil pump 82 in an engine lubrication system 84 are distinct components, separate from one another. The engine lubrication system 84 further include an oil sump 86 designed to receive lubricant from the cylinder 70. The engine lubrication system 84 also includes the oil gallery 6 and a lubricant line 88 extending from the oil gallery 6 and a piston lubrication device 90 (e.g., lubrication nozzle). The piston lubrication device 90 is designed to direct (e.g., spray) lubricant onto the piston 71. It will be appreciated that additional lubrication devices may receive lubricant from the oil gallery such camshaft lubrication devices, crankshaft lubrication devices, etc. It will also be appreciated that the device 4 may be included in the CNG fuel delivery system 78.

The feed pressure supply apparatus 12 and the lubricant reservoir 10 connect a first lubricant-conducting line 92, to which a feed pressure valve 20 is assigned. The feed pressure which is supplied by the feed pressure supply apparatus 12 can be reduced with the feed pressure valve 20. The lubricant reservoir 10 and the injection rail 8 of the internal combustion engine 2 connect a second lubricant-connecting line 93, wherein the injection rail 8 is connected to the fuel injection nozzle 30 in a gaseous-medium-conducting fashion. A lubricant metering valve 22 is assigned to the second lubricant-conducting line. With the lubricant metering valve 22 the quantity of lubricant which is fed to the fuel injection nozzle 30 can be reduced.

A third lubricant-conducting line 94 connects the oil gallery 6 of the internal combustion engine 2 to the lubricant reservoir 10, wherein a shut-off valve 18 is provided between the oil gallery 6 and the lubricant reservoir 10. The oil gallery 6 is a component of a lubricant circuit for lubricating components of the internal combustion engine 2, such as e.g., pistons in their respective cylinders. Alternatively, the third lubricant-conducting line can also connect an oil sump of the internal combustion engine 2 to the lubricant reservoir 10. Furthermore, it is also possible to provide that the lubricant reservoir is designed to store a quantity of lubricant which is related to the service life. It will also be appreciated that lubricant may flow from the oil gallery 6 into the lubricant reservoir 10 during selected time periods. For instance, the lubricant may first be flowed from the oil gallery 6 to the lubricant reservoir 10. Continuing with such an example, the shut-off valve 18 may subsequently be closed and the feed pressure valve 22 may be opened to allow for pressurization of the lubricant reservoir 10. In this way, the lubricant reservoir 10 may achieve a desired fill level and pressure, facilitating accurate dosing of lubricant into the injection rail 8 from the reservoir. However, in other examples, the lubricant reservoir 10 may be filled from lubricant from the oil gallery 6 during pressurization of the reservoir.

Furthermore, by routing lubricant from the oil gallery 6 to the lubricant reservoir 10, a desired amount of lubricant can be drawn from the engine lubrication system to provide lubricant to the CNG injection rail 8 and therefore the fuel injector 72. It will be appreciated that the amount of lubricant delivered to the fuel injector may be relatively small when compared to the amount of lubricant utilized in the oil gallery, in some examples. As such, drawing lubricant from the oil gallery in this way will have a small impact on engine lubrication system efficiency, in some instances.

The feed pressure supply apparatus 12 for applying a feed pressure to lubricant stored in the lubricant reservoir 10 has, in the present exemplary embodiment, a cylinder 14 and a piston 16 which can be moved in the cylinder 14. A drive 96 e.g., a solenoid or an electric motor, is operatively connected, for this purpose, to the piston 16.

In addition, the device 4 for supplying lubricant has, in the present exemplary embodiment, a pressure-detection apparatus 32 with a first pressure sensor 26 and a second pressure sensor 28 which are each connected to the pressure-detection apparatus 32 in a measurement-data-transmitting fashion.

With the first pressure sensor 26, a first measured pressure value which is representative of a pressure in the fuel injection nozzle 30 can be acquired, and with the second pressure sensor 28 a second measured pressure value which is representative of a pressure in the lubricant reservoir 10 can be acquired. Furthermore, the device 4 for supplying lubricant has a control unit 34 which is designed to read in and compare the first and second measured pressure values, and to supply a control signal for closing the feed pressure valve 20 if the second measured pressure value is higher than the first measured pressure value. In this way, the lubricant may be delivered to the injection rail 8 at a desired pressure. In other examples, however, lubricant may be delivered to the injection rail at a higher pressure than the pressure in the injection rail.

The control unit 34 (e.g., controller) is shown in FIG. 1 as a conventional microcomputer including: microprocessor unit 52, input/output ports 54, read-only memory 56, random access memory 58, keep alive memory 59, and a conventional data bus. Control unit 34 is configured to receive various signals from sensors coupled to the internal combustion engine 2 and send command signals to actuators in components in the vehicle, such as a throttle (not shown), the valves 18, 20, and 22, drive 96, pressure regulator 100, etc. Additionally, the control unit 34 is also configured to receive pedal position (PP) from a pedal position sensor 60 coupled to a pedal 62 actuated by an operator 64. Therefore, in one example, the control unit 34 may receive a pedal position signal and adjust actuators in the throttle based the pedal position signal to vary engine speed. It will be appreciated that other components receiving command signals from the controller may function in a similar manner. Additionally, it will also be appreciated that the control unit 34 may also receive signals from sensors such as pressure sensor 26, pressure sensor 28, filling level sensor 102, an engine speed sensor (not shown), a manifold air pressure sensor (not shown), an exhaust gas sensor (not shown), etc. Furthermore, the control unit 34 may also be designed to determine other engine or vehicle operating conditions from the sensor readings.

During operation, CNG is fed from the CNG reservoir 80 (e.g., high-pressure tank) via a fuel line 98 to a pressure regulator 100 and regulated there, in order to be fed then to the internal combustion engine 2. It will be appreciated that the feed pressure valve 20 and/or the feed pressure supply apparatus 12 may be adjusted based on the configuration (e.g., degree of openings/closing) of the pressure regulator 100. For example, opening the pressure regulator 100 to a greater degree increases pressure in the injection rail 8. Consequently, the feed pressure valve 20 may be opened or the degree of opening of the feed pressure valve and/or the output of the feed pressure supply apparatus 12 may be increased to increase the pressure of the lubricant delivered to the injection rail 8. Furthermore, the pressure in the lubricant reservoir 10 may be prevented from increasing beyond the injection rail pressure, in some examples. As such, the lubricant reservoir pressure may be kept at or below injection rail pressure, in some instances.

By moving the piston 16 in the cylinder 14 of the feed pressure supply apparatus 12, feed pressure is generated, as result of which feed pressure lubricant passes out of the lubricant reservoir 10 through the lubricant-metering valve 22 and through the injection rail 8 to the fuel injection nozzle 30. In this context, the quantity of lubricant is set with the lubricant-metering valve 22. However, in other examples, other suitable devices (e.g., rotors, vanes, etc.) for increasing lubricant pressure in the lubricant reservoir 10 may be employed in the feed pressure supply apparatus 12.

In one example, if the control unit 34 detects that the second measured pressure value is higher than the first measured pressure value, the feed pressure valve 20 is closed. This prevents a pressure-induced reversal of the flow of the lubricant, which would otherwise lead to an undersupply of lubricant.

If the level of the lubricant in the lubricant reservoir 10 undershoots a lower threshold value which is indicative of a reliable supply of lubricant to the fuel injection nozzle 30, the control unit 34 generates a further control signal which causes the shut-off valve 18 to open, with the result that lubricant can flow out of the oil gallery 6 into the lubricant reservoir 10. In order to detect the level of the lubricant, the control unit 34 can be connected in a measurement-data-transmitting fashion to the filling level sensor 102 which is arranged in the lubricant reservoir 10.

With this device 4 for supplying lubricant it is possible to improve the supply of lubricant to the injection nozzle 30 of the internal combustion engine 2 which is operated with CNG as fuel.

LIST OF REFERENCE DESIGNATIONS

Internal combustion engine 2
Device 4
Oil gallery 6
Injection rail 8
Lubricant reservoir 10
Feed pressure supply apparatus 12
Cylinder 14
Piston 16
Shut-off valve 18
Feed pressure valve 20
Lubricant-metering valve 22
Control unit 24
Pressure sensor 26
Pressure sensor 28
Fuel injection nozzle 30
Pressure-detection apparatus 32
Control unit 34
Microprocessor unit 52
Input/output ports 54
Read-only memory 56
Random access memory 58
Keep alive memory 59
Pedal position sensor 60
Pedal 62
Operator 64
Cylinder 70
Piston 71
Fuel injector 72
Connecting line 74
Injection device(s) 76
CNG fuel delivery system 78
CNG reservoir 80
Oil pump 82
Engine lubrication system 84
Oil sump 86
Lubricant line 88
Piston lubrication device 90
First lubricant-conducting line 92
Second lubricant-connecting line 93
Third lubricant-conducting line 94
Drive 96
Fuel line 98
Pressure regulator 100
Filling lever sensor 102

FIG. 2 shows a method 200 for operation of a CNG fuel delivery system. The method 200 may be implemented via the engine, CNG fuel delivery system, etc., described above with regard to FIG. 1. However, in other examples, other suitable engines, fuel delivery systems, etc., may be employed to implement method 200. Furthermore, the method 200 may be implemented, at least in part, as computer readable instructions stored in non-transitory memory executable by a processor.

At 202 the method includes flowing a lubricant from an oil gallery to a lubricant reservoir. It will be appreciated that shut-off valve 18 may be opened to facilitate lubricant flow from the oil gallery to the lubricant reservoir.

At 204 the method includes pressurizing the lubricant reservoir through operation of a feed pressure supply apparatus. For instance, a drive in the apparatus may be used to initiate lubricant reservoir pressurization.

At 206 the method includes determining if a pressure in the lubricant reservoir is greater than a threshold pressure. In one example, the threshold pressure may be injection rail pressure. However, other thresholds have been contemplated, such as a pressure less than injection rail pressure.

If it is determined that the pressure in the lubricant reservoir does not exceed the threshold pressure (NO at 206) the method returns to 204. On the other hand, if it is determined that the pressure in the lubricant reservoir is greater than the threshold pressure (YES at 206) the method advances to 208. At 208 the method includes discontinuing lubricant pressurization in the lubricant reservoir. The shut-off valve may be closed to discontinue lubricant reservoir pressurization.

At 210 the method includes flowing the pressurized lubricant from the lubricant reservoir to the injection rail through operation of a lubricant metering valve coupled to a lubricant line attached to the lubricant reservoir and the injection rail. In this way, the injection rail is dosed with a desired amount of lubricant to reduce the likelihood of fuel rail and injector degradation, malfunction, etc. It will be appreciated that in other examples, the lubricant reservoir may be actively pressurized during lubricant dosing of the injection rail.

Next at 212 the method includes determining if the injection rail pressure has been adjusted. For instance, the injection rail pressure may be increased or decreased depending on engine operating conditions to augment combustion operation. It will therefore be appreciated that increases in engine load and/or speed may trigger injection rail pressure adjustments, in some examples.

If the injection rail pressure has not been adjusted (NO at 212) the method advances to 214. At 214 the method includes maintaining current injection rail lubricant metering strategy.

On the other hand, if the injection rail pressure has been adjusted (YES at 212) the method moves to 216. At 216 the method includes adjusting lubricant metering to the injection rail based on the injection rail pressure adjustment. For instance, the flow and/or pressure of lubricant delivered to the injection rail may be increased responsive to an increase in injection rail pressure. In one example, the increase in flow of lubricant can be proportional to the increase in injection rail pressure over a range of flow. In another example, a calibrated lookup table may map the amount of increased lubricant to the injection rail pressure. On the other hand, in selected conditions, the flow and/or pressure of lubricant delivered to the injection rail may be decreased responsive to a decrease in injection rail pressure. As previously discussed, engine speed and/or load may be correlated to injection rail pressure, in some examples.

At 218 the method includes flowing pressurized lubricant from an oil pump to the oil gallery, where the oil pump is different from the feed pressure supply apparatus. The oil pump may receive oil from an oil sump. It will be appreciated that storing the lubricant for injection rail lubrication separately from an oil sump allows the pressure of the lubricant delivered to the rail to be actively and precisely controlled to decrease likelihood of an under lubrication injection rail and/or fuel injector.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. Furthermore, in some embodiments certain method steps may be omitted from the control strategy.

As used herein, the term "approximately" is construed to mean plus or minus five percent of the range unless otherwise specified.

It will be appreciated that the configurations disclosed herein are exemplary in nature, and that these specific embodiments are not to be considered in a limiting sense, because numerous variations are possible. For example, the above technology can be applied to V-6, I-4, I-6, V-8, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A device for supplying a lubricant for a fuel injection nozzle for injecting compressed natural gas (CNG) into an internal combustion engine, the device comprising:
 a lubricant reservoir for supplying the lubricant to the device; and
 a feed pressure supply apparatus for applying a feed pressure to the lubricant which is stored in the lubricant reservoir;
 where a feed pressure valve for setting the feed pressure is provided between the feed pressure supply apparatus and the lubricant reservoir;
 where a lubricant metering valve for metering the lubricant is provided between the lubricant reservoir and the fuel injection nozzle; and
 where the lubricant is fed to the lubricant reservoir from an oil gallery of the internal combustion engine.

2. The device of claim 1, where the oil gallery is designed to deliver lubricant to one or more lubricated components in the internal combustion engine.

3. The device of claim 2, where a shut-off valve is provided between the oil gallery and the lubricant reservoir.

4. The device of claim 3, where the lubricant is fed from an oil sump of the internal combustion engine into the lubricant reservoir.

5. The device of claim 1, where a first measured pressure value which is representative of a pressure in the fuel injection nozzle and a second measured pressure value which is representative of a pressure in the lubricant reservoir acquired with a pressure-detection apparatus, and the device is designed to close the feed pressure valve if the second measured pressure value is higher than the first measured pressure value.

6. The device of claim 1, where the feed pressure supply apparatus has a cylinder and a piston configured to be moved in the cylinder.

7. The device of claim 1, where the fuel injection nozzle is connected to an injection rail of the internal combustion engine.

8. The device of claim 1, where the device is included in an internal combustion engine.

9. The device of claim 1, where the device is included in a motor vehicle having an internal combustion engine.

10. A compressed natural gas (CNG) fuel delivery system comprising:
an injection rail receiving CNG from a CNG reservoir and receiving a lubricant from a lubricant metering valve coupled to a lubricant reservoir;
where the lubricant reservoir receives the lubricant from an oil gallery and is coupled to a feed pressure supply apparatus designed to pressurize the lubricant reservoir; and
a controller including computer readable instructions stored on non-transitory memory that when executed by a processor cause the controller to:
pressurize the lubricant reservoir through operation of the feed pressure supply apparatus; and
regulate an amount of the lubricant flowing through the lubricant metering valve based on one or more engine operating conditions through operation of the lubricant metering valve.

11. The CNG fuel delivery system of claim 10, where the oil gallery receives pressurized lubricant from an oil pump and where the oil pump is different from the feed pressure supply apparatus.

12. The CNG fuel delivery system of claim 10, where the controller includes computer readable instructions stored on the non-transitory memory that when executed by the processor cause the controller to:
discontinue lubricant reservoir pressurization when a pressure in the lubricant reservoir exceeds a pressure of the injection rail.

13. The CNG fuel delivery system of claim 10, where the controller includes computer readable instructions stored on the non-transitory memory that when executed by the processor cause the controller to:
increase the amount of lubricant flow through the lubricant metering valve in response to an increase in engine speed and/or load.

14. The CNG fuel delivery system of claim 10, where the injection rail is coupled to a fuel injection nozzle directly coupled to an engine cylinder.

15. The CNG fuel delivery system of claim 10, where the feed pressure supply apparatus has a cylinder and a piston configured to be moved in the cylinder.

16. A method for operating a fuel delivery system, comprising:
flowing a lubricant from an oil gallery to a lubricant reservoir;
pressurizing the lubricant in the lubricant reservoir through operation of a feed pressure supply apparatus coupled to the lubricant reservoir; and
flowing the pressurized lubricant from the lubricant reservoir to the injection rail through operation of a lubricant metering valve coupled to a lubricant line extending between the lubricant reservoir and the injection rail, where the oil gallery is configured to flow lubricant to one or more lubricated components in a CNG internal combustion engine.

17. The method of claim 16, further comprising discontinuing lubricant pressurization in the lubricant reservoir when the pressure in the lubricant reservoir exceeds a pressure in the injection rail.

18. The method of claim 16, further comprising flowing pressurized lubricant from an oil pump to the oil gallery, where the oil pump is different from the feed pressure supply apparatus.

19. The method of claim 16, further comprising discontinuing lubricant flow from the oil gallery to the lubricant reservoir when the lubricant reservoir reaches a predetermined lubricant level.

* * * * *